Figure 2A:
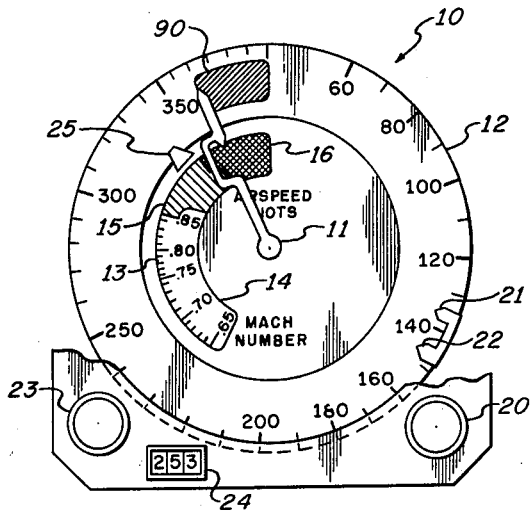

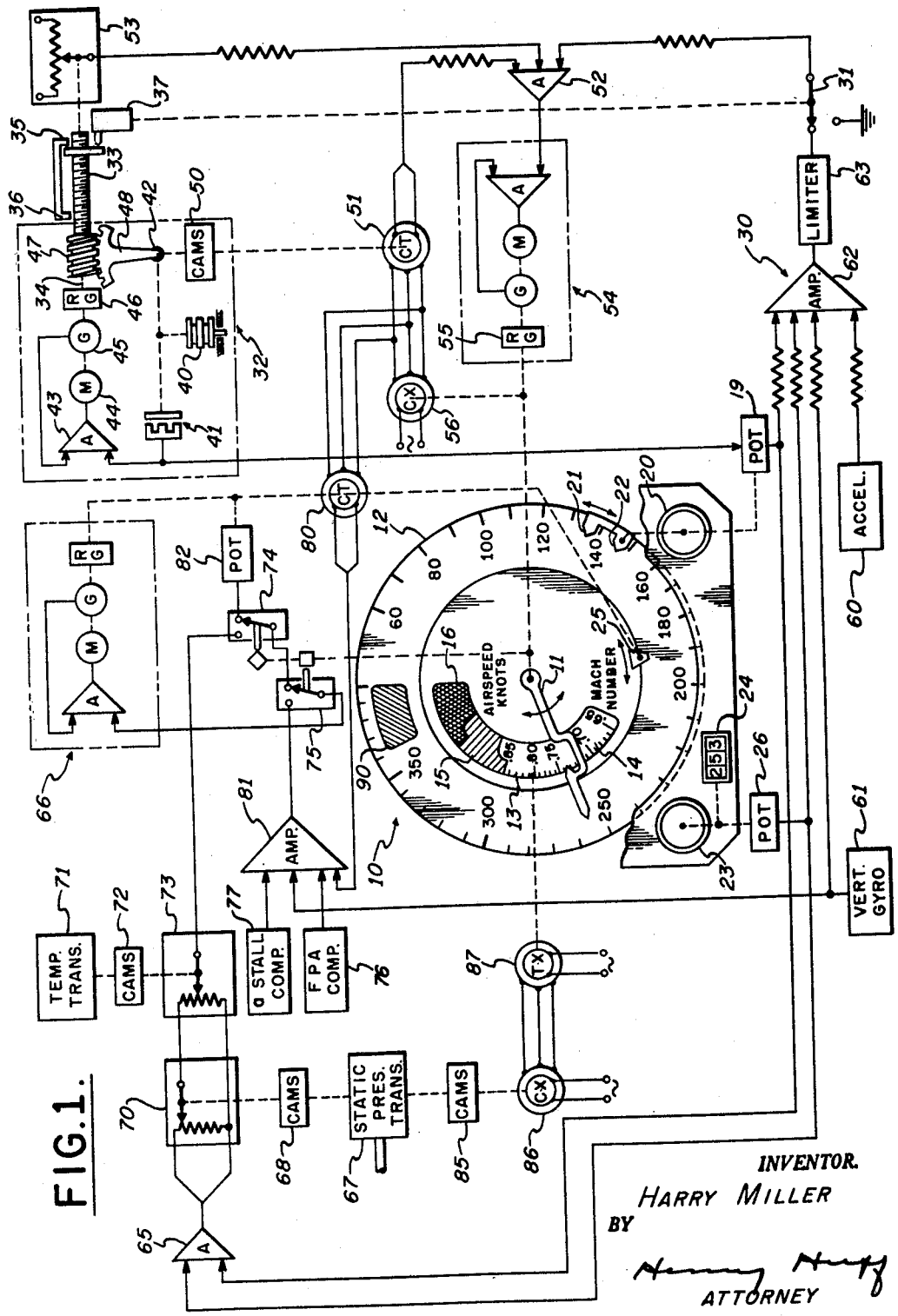

June 15, 1965 H. MILLER 3,188,861
AIRCRAFT PERFORMANCE INDICATING APPARATUS
Filed May 24, 1961 2 Sheets-Sheet 2

INVENTOR.
HARRY MILLER
BY
*Henry Huff*
ATTORNEY

United States Patent Office 3,188,861
Patented June 15, 1965

3,188,861
AIRCRAFT PERFORMANCE INDICATING
APPARATUS
Harry Miller, Scottsdale, Ariz., assignor to Sperry Rand
Corporation, Great Neck, N.Y., a corporation of
Delaware
Filed May 24, 1961, Ser. No. 121,277
3 Claims. (Cl. 73—178)

This invention relates to aircraft performance indicating apparatus and particularly to compound aircraft forward motion indicating apparatus of the type which provides an indication of the forward velocity of the craft. The present invention provides a single instrument for indicating the forward motion of the craft during all phases of take-off, climb, cruise, approach and landing.

Previously, the pilot was required to refer to separate indicators to provide information concerning air speed, Mach number, stall margin, rotate speed, lift-off speed, take-off monitoring and maximum air speed or Mach number. Scanning a number of instruments to provide this information is time consuming and difficult particularly when the pilot is in a crucial maneuver which necessitates other activities on his part.

Further, present air speed indicators do not provide adequate resolution at the lower air speeds associated with take-off and landing maneuvers. Although this may be accomplished with expanded low air speed scales and a plurality of pointers, it is desirable with a clock display of air speed data to have only a single pointer to minimize clutter and emphasize readability.

It is particularly desirable to display the forward motion information from take-off to landing on a single instrument in order that the pilot can concentrate his attention on one instrument and primarily on a single pointer. By incorporating take-off acceleration monitoring data on the air speed indicator, the take-off monitor display is placed in an optimum position on the instrument panel, provides take-off moitor and air speed information on a single common pointer, and utilizes a minimum of critical instrument panel space.

In these days of high speed, high altitude flight, it is advantageous to indicate Mach number as well as air speed and to provide a common pointer which simultaneously provides an indication of both of these values within one indicator. It is also desirable to simultaneously provide an indication of the values of air speed and Mach number which should never be exceeded because of structural or compressibility limitations. It is also desirable to provide an indication of the minimum desirable air speed for stall warning purposes by means of the same indicator.

It is therefore a primary object of the present invention to provide aircraft forward motion performance indicating apparatus which combines a plurality of kinds of information within a single instrument.

It is a further object of the present invention to provide an aircraft performance indicating apparatus which provides a composite indication of the aircraft forward motion performance from take-off to landing.

It is another object of the present invention to provide an aircraft forward motion indicating apparatus which utilizes a minimum of instrument panel space while providing a simple reliable indication of a number of aircraft performance functions.

These and other objects of the present invention are achieved by aircraft forward motion indicating apparatus which utilizes a single common pointer that is cooperative with take-off monitor, air speed, and Mach number indicia to provide information relative thereto. An air speed dial has linear graduations thereon over a first low air speed range and a logarithmic scale over a second high air speed range. A rotatable logarithmic Mach number dial is disposed adjacent to and concentric with the logarithmic portion of the air speed dial in order that the common pointer simultaneously indicates air speed and Mach number. The instrument further includes positionable indices relating to minimum air speed, lift-off air speed, maximum air speed and maximum Mach number that are cooperative with the common pointer to provide indications of the relative performance of the aircraft. By overlapping similarly shaped masks adjusted in accordance with maximum permissible air speed and maximum permissible Mach number respectively, a composite indicium is provided that is cooperative with the air speed and Mach graduations in order that the lower limit is prominently displayed.

Figure 2B:
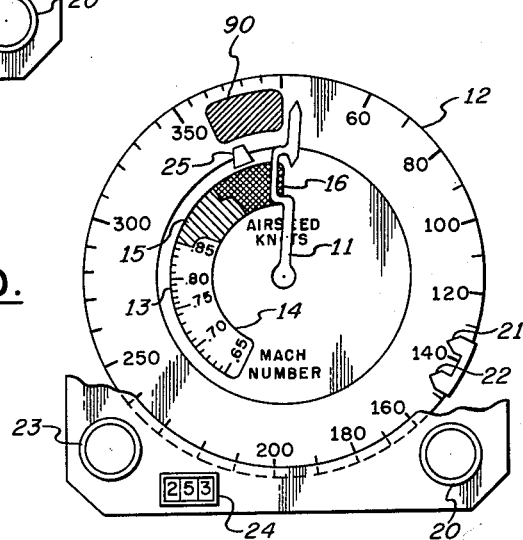
Figure 2C:
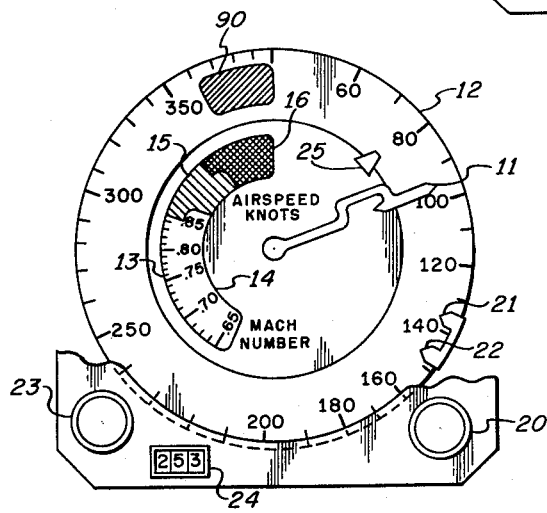

Referring now to the drawings,

FIG. 1 is a schematic wiring diagram of an aircraft performance indicating apparatus incorporating the present invention; and FIGS. 2a to c inclusive are views of the instrument as seen by the pilot during various flight conditions.

Referring now to FIG. 1 the instrument 10 has a housing, which for purposes of clarity is not shown, that forms the supporting and covering structure for the various indicating elements and certain of the actuating elements. The housing has a transparent opening through which the various indicating elements are viewable.

The forward air speed and take-off performance of the aircraft is indicated by means of a common air speed take-off monitor pointer 11 which is cooperative with and moves over the face of a fixed air speed dial 12 graduated to show calibrated air speed between 60 and 400 knots. The dial face interval covering plus and minus 24° from the 12 o'clock position provides take-off monitoring information over a first dial portion in a manner to be explained subsequently. A second dial portion, which provides air speed designations, consists of two parts. The part of the air speed dial 12 between 60 and 220 knots is linear with respect to knots and covers 180° of pointer rotation. This part of the dial 12 represents an expanded scale designed for use during take-off and landing maneuvers. The part of the dial 12 between 220 and 400 knots is a logarithmic scale and the pointer displacements in this part are proportional to the logarithm of the pitot-static pressure. This portion of the dial 12 is used to monitor air speed with respect to the structural limitations of the aircraft.

The area between 220 and 400 knots has an arcuate aperture 13 adjacent to the calibrated air speed scale through which a rotatable dial 14 appears for displaying Mach number. The Mach dial 14 is rotatably mounted concentric with air speed dial 12. The air speed pointer 11 is arranged to rotate about the same axis as the Mach dial 14. Over the range of 220 to 400 knots, the air speed pointer 11 is arranged to point at the Mach dial 14 as well as the air speed dial 12. The Mach dial 14 is rotated counterclockwise as a function of increasing altitude in a manner to be explained. For example, the particular configuration shown in FIG. 1 indicates the condition at 34,000 feet of altitude. At sea level, for example, the Mach dial 14 will have moved clockwise to a position where the Mach indication at 220 knots is about .33 and at the 400 knot position the Mach indication is about .61.

A rotatable maximum permisisble Mach number mask 15 is adjustable and rotates with the Mach dial 14 to cover the graduations on the Mach dial 14 above the maximum permissible value which is shown for example as a Mach number of .85. The position of the Mach mask 15 is adjustable for example by means of a slip clutch and adjusting set screw, not shown, in order to set the maximum permissible value. After this value is set, the Mach mask 15 then rotate with Mach dial 14. A second adjustable mask 16 is cooperative with the air speed dial 12 to provide an indication of the maximum allowable calibrated air speed of the aircraft and overlies the Mach mask 15. The maximum permissible air speed mask 16 is also cooperative with the Mach dial 14 to indicate the equivalent Mach number which corresponds with the maximum allowable air speed. The maximum permissible air speed mask 16 is adjustable about the same axis as the Mach mask 15 by means of a set screw and ring gear (not shown). The masks 15 and 16 have approximately the same dimensions in order that they tend to visually merge into one to provide a dramatic indication of the maximum permissible value.

A "$V_2$" set knob 20 is provided on the face of the instrument 10 and is connected to position ganged indices 21 and 22. The indices 21 and 22 are cooperative with the air speed dial 12 to provide an indication of the rotate velocity and the lift-off velocity "$V_2$" respectively of the aircraft during the take-off maneuver. The pilot positions the indices 21 and 22 on the basis of the lift-off velocity which is dependent upon the gross weight of the aircraft. The rotate velocity of the aircraft is a value of air speed which is somewhat less than the lift-off air speed, for example about 10 knots less. The indices 21 and 22 are rotatable about the same axis as the air speed pointer 11. The "$V_2$" set knob 20 is also connected to rotate the wiper of a potentiometer 19 for reasons to be explained.

A required acceleration set knob 23 is connected to a readout counter 24 and to the wiper of a potentiometer 26 for reasons to be explained. The required acceleration knob 23 is set by the pilot to correspond to a precalculated minimum initial forward acceleration required of the aircraft to safely take-off. Achievement of this required acceleration indicates that the aircraft has sufficient thrust to achieve lift-off at air speed "$V_2$" within the available runway length.

A servo driven minimum air speed index 25 is also provided to rotate in a circular track about the same axis as the pointer 11. The minimum air speed index 25 is cooperative with the air speed dial 12 in order that the position of the index 25 indicates the lowest safe air speed of the airplane. The minimum air speed index 25 is designed to define this limit for all phases of flight including take-off, climbout, cruise, approach and landing in a manner to be explained.

The air speed-take-off monitor pointer 11 serves the dual function of acting as a take-off monitor (TOM) during the take-off maneuver up to 60 knots while above 60 knots it provides an indication of the calibrated air speed. Below 60 knots, the pointer 11 is responsive to signals from a take-off monitoring apparatus 30 by means of a switch 31 which is then in its upward position as shown. Above 60 knots, the switch 31 is in its downward position thereby disconnecting the take-off monitoring apparatus 30 and the pointer 11 is responsive to the pitot-static signal $q$ from a pitot-static pressure transducer 32 in a manner to be explained.

The pitot-static pressure transducer 32 may be of the type generally disclosed in U.S. Patent No. 2,729,780 of H. Miller et al. entitled "Altitude Control for Automatic Pilots" issued January 3, 1956, which provides a shaft position proportional to the pitot-static pressure $q$. The transducer 32 includes a lead screw mechanism 33 connected to a pressure shaft 34 that has stops 35 and 36 set at 60 and 400 knots respectively. A limit switch 37 is operated when the lead screw 33 abuts against the 60 knot stop 35.

The pitot-static pressure transducer 32 includes an evacuated bellows 40 responsive to pitot-static pressure which positions the armature of an E-pick-off 41 against the spring restraint of a torsion bar 42. The output signal of the E-pick-off 41 is representative of the pitot-static pressure $q$ and has an amplitude and phase representative of the magnitude and sense respectively of the armature displacement from a force balance central position. The E-pick-off 41 is connected to an input terminal of a summing amplifier 43 which in turn is connected to control a servomotor 44. The output shaft of the servomotor 44 is connected to drive a tachometer generator 45 and also through a reduction gearing 46, the shaft 34 and thus the lead screw 33. By means of a worm gear 47 integral with the lead screw 33 which has its sector gear 48 connected to the torsion bar 42, the torsion bar 42 is rotated in a direction to provide a restoring moment which opposes the moment resulting from the bellows response to a pitot-static pressure change. The restoring moment obtained by winding the torsion bar 42 returns the E-pick-off armature to its null position following any pressure change which causes the bellows 41 to displace the armature. The tachometer generator 45 provides a rate stabilization feedback signal to an input terminal of the summing amplifier 43. When operating in the 60 to 400 knot range, the signal from the E-pick-off 41 is kept at a null by the follow-up action of the pitot-static servo loop as described above.

When the air speed goes below 60 knots, as for example during the early portion of the take-off, the servomotor 44 drives the lead screw 33 against the stop 35 thereby stalling the servomotor 44 and operating the limit switch 37. As the air speed continues to drop the signal from the E-pick-off 41 increases because the servo loop is stalled and it will be a maximum value when the airplane is standing still. The pitot-static pressure transducer 32 further includes cams 50 connected to the torsion bar 42 which convert the linear pitot-static pressure signal $q$ which is representative of the air speed into a logarithmic function over the air speed range of 220 to 400 knots. The cams 50 are connected to position the rotor of a synchro control transformer 51. The control transformer 51 is connected to an input terminal of a summing amplifier 52.

The pitot-static transducer 32 also includes a calibration potentiometer 53 connected to the lead screw 33 to provide a scale correction signal to another input terminal of summing amplifier 52. The output terminal of the summing amplifier 52 is connected to drive a motor-generator set 54 which in turn displaces the pointer 11 in accordance with the time integral of the output of amplifier 52 through reduction gearing 55. The pointer 11 is connected to the rotor of a synchro transmitter 56 which has its stator connected to the stator of the control transformer 51.

The take-off monitor apparatus 30 is of the type disclosed in U.S. Patent No. 3,077,109 of Theodore Gold entitled Aircraft Take-Off Performance Monitor Apparatus, issued February 12, 1963, which utilizes a forward acceleration signal from an accelerometer 60 and a pitch correction signal from a vertical gyro 61. The actual acceleration signal from the accelerometer 60 and the pitch attitude signal from the vertical gyro 61 are connected to respective input terminals of a summing amplifier 62.

The pick-off 41 is connected to energize the resistive windings of the potentiometer 19 in accordance with dynamic pressure $q$ in order to generate the acceleration correction signal $$\frac{g}{W} C_D q S$$

due to the drag of the airplane in a manner fully explained in the aforementioned Patent No. 3,077,109 where $g$ = gravitational constant
$W$ = gross weight
$C_D$ = coefficient of drag
$q$ = dynamic pressure
$S$ = wing area The required lift-off velocity "$V_2$" is a function of the gross weight of the aircraft. Therefore, setting the "$V_2$" knob 20 provides a signal from the output of the potentiometer 19 representative of $$\frac{g}{W} C_D q S$$

which ensures that the pointer 11 remains in the "GO" portion of the take-off monitor display even though the forward acceleration of the aircraft descreases in a normal manner during take-off because of the increase in drag as $q$ increases as explained in the aforementioned Patent No. 3,077,109. The potentiometer 19 is connected to an input terminal of the summing amplifier 62 in a manner explained in the aforementioned Patent No. 3,077,109.

The signals from the potentiometer 19, the accelerometer 60 and the vertical gyro 61 are combined in the summing amplifier 62 to provide a signal representative of the corrected actual acceleration during the take-off run. The signals from the potentiometer 19 and the accelerometer 60 are added while the signal from the vertical gyro 61 compensates for the change in pitch attitude of the aircraft during take-off in a manner more fully explained in said U.S. Patent No. 3,077,109. The potentiometer 26 provides a signal representative of the required initial forward or take-off acceleration and it is connected to another input terminal of the summing amplifier 62 in order that the output terminal thereof provides a signal representative of the difference between the required take-off acceleration and the actual take-off acceleration, the latter compensated for pitch and drag effects. This difference signal is limited in a limiter 63 before being applied through the switch 31 to an input terminal of the summing amplifier 52.

With the pitot-static pressure transducer servo loop stalled, the control transformer 51 driven by the cams 50 is also stalled at the 60 knot reference position. If the take-off monitor apparatus 30 were not operating, the air speed pointer position would normally be stalled at 24° clockwise from 12 o'clock in accordance with the calibration procedure of the pitot-static pressure transducer 32 by means of the calibration potentiometer 53. However, below 60 knots the limit switch 37 connects the limiter 63 to the summing amplifier 52 resulting in positioning the air speed pointer 11 24° counterclockwise from 12 o'clock assuming representative required acceleration settings on the required acceleration knob 23.

In operation, at the beginning of the take-off run when the pilot applies power and releases brakes for the take-off, the accelerometer-vertical gyro signal will increase in proportion to the forward acceleration resulting in positioning the air speed pointer near the 12 o'clock reference, assuming adequate forward acceleration. The air speed data from the control transformer 51 and the calibration potentiometer 53 will not reflect air speed because the pitot-static pressure transducer 32 is stalled against the 60 knot stop 35. As the aircraft increases speed, the signal from the potentiometer 19 will compensate for drag effects in a manner more fully disclosed in the aforementioned Patent No. 3,077,109. As soon as the aircraft attains an air speed of 60 knots, the signal from the pick-off 41 reverses phase resulting in the lead screw 33 backing away from the stop 35 thereby opening the limit switch 37 which causes the switch 31 to open disconnecting the limiter 63 from the summing amplifier 52 thus removing all take-off monitoring signals from the pointer 11.

For air speeds in excess of 60 knots, the take-off monitoring function is obtained by a position comparison between the minimum air speed index 25 and the pointer 11. The index 25 serves the dual purpose of indicating a second phase of the take-off monitoring function and also provides stall warning information once the aircraft is airborne.

The second phase of the take-off monitoring function is primarily a comparison between a minimum inertial schedule and actual calibrated air speed performance. To make the comparison valid it is preferable to correct the inertial schedule so that it reflects the air density effects on calibrated air speed. This is a function of pressure altitude and air temperature. The inertial schedule must also continue to reflect the drag forces on the aircraft which are proportional to dynamic pressure.

The signal from the potentiometer 19 representative of the drag forces on the aircraft is connected to an input terminal of a summing amplifier 65 and subtracted from a signal representative of the required acceleration obtained from the potentiometer 26 which is connected to another input terminal of the summing amplifier 65. This acceleration signal from the summation amplifier 65 is converted to a velocity signal by operating the minimum air speed index servo 66 as an integrator so that the position of the index 25 relative to the linear portion of the air speed dial 12 represents the value of air speed that should be obtained after an interval of time. However, since the position of the index 25 is compared to the position of the calibrated air speed pointer 11, the inertial signal must be modified before integration to correct for air density.

This is accomplished by means of a static-pressure transducer 67 which provides an output shaft rotation representative of the static pressure. The output shaft of the transducer 67 is connected to drive cams 68 in a manner to provide a shaft rotation representative of $$\sqrt{\frac{p}{p_0}}$$

where $p$ is static pressure and $p_0$ is standard sea level pressure. A potentiometer 70 is connected to the output terminal of the summing amplifier 65 and has its wiper connected to the output shaft of the cams 68 thereby providing static pressure compensation. In a similar manner a temperature transducer 71 provides an output shaft rotation representative of ambient temperature, which is converted by means of cams 72 to a shaft position representative of $$\sqrt{\frac{T_0}{T}}$$

where $T_0$ is standard seal level air temperature and $T$ is absolute air temperature. A potentiometer 73 is connected to the output terminals of the potentiometer 70 and has its wiper positioned by the output shaft of the cams 72 in order that the minimum inertial signal from the potentiometer 73 is corrected for air density.

The minimum air speed index servo 66 is started by means of a take-off switch 74 when the pointer 11 passes the 12 o'clock position of the air speed dial 12 which occurs the instant the aircraft achieves a minimum acceptable take-off acceleration. At this instant the take-off switch 74 will be placed in its leftward position connecting the potentiometer 73 through the take-off switch 74 and a 100 knot switch 75 (to be described) to the minimum air speed index servo 66. The 100 knot switch 75 is in its rightward position as shown connecting the switch 74 to the servo 66 below 100 knots air speed.

Assuming proper operation during take-off, the 100 knot switch 75 will be placed in its leftward position when the pointer 11 indicates an air speed of 100 knots thereby converting the servo 66 from an integrator to a position servo driven by stall margin data in a manner to be explained. The stall monitoring function will thus be available the instant the aircraft is airborne and can be used during the climb-out of the aircraft.

The stall margin implementation is based on the assumption that the difference between actual air speed and stall air speed is linearly proportional to the difference between stall angle of attack and actual angle of attack.

The relationship is $$q_s = \frac{\alpha}{\alpha_s} q$$

where, $q_s$=dynamic pressure at stall
$q$=actual dynamic pressure
$\alpha$=actual angle of attack
$\alpha_s$=stall angle of attack This can be written:

$$\log q - \log q_s = \log \alpha_s - \log \alpha$$

It can be shown that between 100 and 220 knots $\log q - \log q_s$ is approximately proportional to $V_c - V_s$ where $V_c$ is calibrated air speed and $V_s$ is stall air speed. Also $\log \alpha_s - \log \alpha$ is approximately proportional to $\alpha_s - \alpha$.

The actual angle of attack is computed by means of pitch data from the vertical gyro 61 and a computed flight path angle signal from a flight path angle computer 77. The stall angle of attack is a function of the aircraft wing configuration and depends upon the position of the flaps, dive brakes, etc. A signal representative thereof is obtained from a stall angle of attack computer 76. To provide a signal proportional to the calibrated air speed minus the stall air speed, a control transformer 80 has its stator connected to the stator of the synchro transmitter 56 while its rotor is connected to the output shaft of the servo 66. The vertical gyro 61, the flight path angle computer 77, the stall angle of attack computer 76, and the rotor of the control transformer 80 are connected to respective input terminals of a summing amplifier 81 in order that the output thereof is representative of the difference between the stall angle of attack and the actual angle of attack. The output terminal of the summing amplifier 81 is connected to the input terminal of the servo 66 by means of the 100 knot switch 75 after the calibrated air speed reaches 100 knots.

The instrument 10 is reset for a new take-off in the following manner. When the aircraft touches down during landing the air speed drops below 100 knots. During the time that the air speed is less than 100 knots and greater than 60 knots during the roll-out, the servo 66 operates as an integrator. The information displayed by the minimum air speed index 25 is of no particular significance at this time and is general the pilot will not be paying any attention to the air speed. When the aircraft speed drops to 60 knots, the Pitot-static pressure transducer 32 will stall against its 60 knot stop 35 as previously explained causing the take-off monitor data to be inserted into the summing amplifier 52. This will cause the pointer 11 to move 24° counterclockwise from the 12 o'clock position and also trip the take-off switch 74 causing the switch 74 to move to its rightward position. The servo 66 will now be driven by feedback data from a potentiometer 82 connected in the feedback path of the servo 66 which is set to be at a null when the minimum air speed index 25 is positioned 43.5° counterclockwise from the 12 o'clock position. Thus, the instrument 10 is now ready for the next take-off sequence.

The static pressure transducer 67 has attached to its output shaft cams 85 which provide a shaft position representative of the logarithm of the static pressure exerted on the transducer 67, i.e. a signal representative of log $p$. The output shaft of the cams 85 is connected to rotate the rotor of a synchro transmitter 86 which has its stator connected to the stator of a torque synchro receiver 87. The rotor of the torquer 87 is connected to rotate the Mach dial 14 in accordance with log $p$ data. The use of log $p$ data to position the Mach dial is based on the following relationship:

$$\frac{q_c}{p} = (1 + .2 M^2)^{3.5} - 1$$

where $q_c$=pitot-static pressure
$p$=static pressure
$M$=Mach number

This can be written as:

$$\log q_c - \log p = \log [(1 + .2 M^2)^{3.5} - 1]$$

This states that Mach number is uniquely defined when the difference between log $q_c$ and log $p$ is a fixed value. The mechanization of the log equation above is achieved by rotating the Mach dial 14 adjacent to the air speed pointer 11 in the region where its motion is logarithmically proportioned. It will be recalled that the air speed dial 12 is graduated to be proportional to log $q_c$ above 220 knots and that the Mach dial 14 is rotated proportional to log $p$. The Mach dial graduations correspond to the expression $$\log [(1 + .2 M^2)^{3.5} - 1]$$

thereby providing the required cooperation in order that the pointer 11 simultaneously indicates air speed and Mach number.

Referring now to FIGS. 2a to 2c, the operation and presentation of the instrument 10 will be explained for a typical flight. The pilot calculates the initial forward acceleration required to be exerted upon release of the brakes and the required air speed for lift-off. These values are inserted by setting the required acceleration knob 23 and the "$V_2$" set knob 20 respectively. As shown in FIG. 2a, when he has accomplished the knob settings, the pointer 11 is displaced 24° counterclockwise from 12 o'clock and the minimum air speed index 25 is displaced 43.5° counterclockwise from 12 o'clock.

When his preflight check is completed, he applies thrust and releases brakes. As shown in FIG. 2b, the pointer 11 should immediately move at least 24° clockwise to a steady position past the 12 o'clock reference. If it does not do so or subsequently drops back, it is indicative of insufficient thrust and the take-off should be aborted. The unsatisfactory region 90 of the air speed dial 12 is distinctively cross-hatched to provide a dramatic "go no-go" presentation.

If the initial acceleration is satisfactory, the minimum air speed index 25 will start to rotate clockwise from its minus 43.5° thereby tending to overtake the pointer 11. When the aircraft attains a calibrated air speed of 60 knots, the pointer 11 will immediately rotate to a position 24° clockwise from 12 o'clock and will thereafter continue to move in accordance with the actual air speed of the aircraft. As shown in FIG. 2c, the minimum air speed index 25 will continue to move and should always trail behind the pointer 11. If the index 25 should overtake the pointer 11 before an air speed $V_1$ is attained at which the aircraft cannot be safely stopped within the remaining runway distance $D_1$, the pilot should abort the take-off. He will then be assured of sufficient runway length for stopping. If the index 25 overtakes the pointer 11 after air speed $V_1$ is reached, the pilot will have no alternative and must try for a successful take-off.

When the aircraft attains a speed of 100 knots, the minimum air speed index 25 reverts to a stall warning mode of operation. It will thus be ready for climb-out at optimum air speed since the amount that it trails the air speed pointer 11 is indicative of the stall margin.

When the climb-out is completed and the aircraft has leveled out, the pilot then adjusts power to attain the desired Mach number. As shown in FIG. 1, the pointer 11 simultaneously indicates air speed and Mach number while the maximum Mach number and air speed are indicated by the masks 15 and 16 respectively. The masks 15 and 16 tend to merge visually to provide a dramatic indication of the maximum allowable value in order that neither the structural nor the compressibility limits of the craft are exceeded.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an aircraft performance indicating apparatus, a fixed dial having a distinctively marked area thereon over a first portion of said dial for monitoring the take-off of said aircraft and air speed designations thereon over a second portion of said dial, a common pointer cooperative with said first and second portions of said dial, means responsive to the performance of said aircraft for providing a signal representative of the difference between the acceleration required to become airborne and the actual acceleration of said craft, means responsive to the air speed of said craft for providing a signal representative thereof, and means including switching means for rendering said pointer responsive to said difference signal for positioning said pointer in accordance with the time integral thereof with respect to said first portion of said dial during at least a portion of the take-off and for rendering said pointer responsive to said air speed signal for positioning said pointer in accordance therewith with respect to said second portion of said dial thereafter.

2. In an aircraft forward motion indicating apparatus, a fixed circular dial having air speed designations thereon over first and second parts of said dial, said air speed designations being linear over said first part portion of said dial and being logarithmic over said second part of said dial, a positionable circular dial concentric with said fixed dial and having Mach number graduations thereon, said Mach number graduations being logarithmic and disposed adjacent to said second part of said fixed dial, means responsive to the performance of the craft for providing a signal representative of the air speed thereof, pressure responsive means for providing a signal representative of a function of the ambient pressure altitude, means responsive to said pressure altitude signal for rotating said positionable dial in accordance with a function thereof, a common positionable pointer cooperable with said air speed and positionable dials positionable in accordance with said air speed signal for providing a simultaneous indication of air speed and Mach number, a Mach number mask slideable over and concentric with said positionable dial for indicating maximum permissible Mach number, means for adjusting said Mach mask in accordance with maximum permissible Mach number, a maximum air speed mask slideable over and concentric with said Mach mask and also cooperative with said fixed dial for indicating maximum permissible air speed, and means for adjusting said air speed mask in accordance with maximum permissible air speed.

3. In an aircraft performance indicating apparatus, a fixed dial having a distinctively marked area thereon over a first portion of said dial for monitoring the take-off of said aircraft and air speed designations thereon over a second portion of said dial, a common pointer cooperative with said first and second portions of said dial, means responsive to the performance of said aircraft for providing a signal representative of the difference between the acceleration required to become airborne and the actual acceleration of said craft, means responsive to the air speed of said craft for providing a signal representative thereof, means including switching means for rendering said pointer responsive to the time integral of said difference signal for positioning said pointer in accordance therewith with respect to said first portion of said dial during at least a portion of the take-off and for rendering said pointer responsive to said air speed signals for positioning said pointer in accordance therewith with respect to said second portion of said dial thereafter, manually adjustable means for providing a signal representative of the velocity required to lift the aircraft off the ground, a positionable lift-off velocity index cooperative with said dial and responsive to said lift-off signal for providing an indication thereof, and means responsive to said lift-off velocity signal for providing an acceleration correction signal to said difference signal providing means to compensate for the decrease in forward acceleration due to increase in drag during take-off.

References Cited by the Examiner
UNITED STATES PATENTS

| | | | |
|---|---|---|---|
| 2,497,431 | 2/50 | Beman | 73—182 X |
| 2,537,240 | 1/51 | Shaw | 73—182 |
| 2,706,407 | 4/55 | Hosford | 73—182 |
| 3,025,494 | 3/62 | Andresen | 73—178 X |
| 3,033,035 | 5/62 | Snodgrass | 73—178 |

OTHER REFERENCES

April 1958; SAE preprint 38C, The Takeoff Progress Indicator.

ROBERT B. HULL, *Primary Examiner.*

L. R. PRINCE, *Examiner.*